United States Patent [19]

Lockemeyer

[11] Patent Number: 5,786,293
[45] Date of Patent: Jul. 28, 1998

[54] PROCESS FOR PRESULFIDING HYDROCARBON PROCESSING CATALYSTS

[75] Inventor: John Robert Lockemeyer, Sugar Land, Tex.

[73] Assignee: Shell Oil Company, Houston, Tex.

[21] Appl. No.: 668,039

[22] Filed: Jun. 17, 1996

[51] Int. Cl.⁶ .................................................. B01J 27/02
[52] U.S. Cl. ......................... 502/216; 502/218; 502/217
[58] Field of Search .......................... 502/164, 216, 502/217, 218

[56] References Cited

U.S. PATENT DOCUMENTS

| | | | |
|---|---|---|---|
| 3,872,028 | 3/1975 | Rijnten et al. | 252/439 |
| 4,089,930 | 5/1978 | Kittrell et al. | 423/239 |
| 4,145,405 | 3/1979 | Gorin | 423/657 |
| 4,177,136 | 12/1979 | Herington et al. | 208/215 |
| 4,474,896 | 10/1984 | Chao | 502/216 |
| 4,520,128 | 5/1985 | Morales et al. | 502/210 |
| 4,530,911 | 7/1985 | Ryan et al. | 502/74 |
| 4,530,917 | 7/1985 | Berrebi | 502/20 |
| 4,606,812 | 8/1986 | Swanson | 208/108 |
| 4,728,682 | 3/1988 | Covino et al. | 423/511 |
| 4,943,547 | 7/1990 | Seamans et al. | 502/150 |
| 4,983,559 | 1/1991 | Berrebi | 502/32 |
| 4,985,389 | 1/1991 | Audeh | 502/516 |
| 4,992,403 | 2/1991 | Takahashi et al. | 502/164 |
| 5,024,751 | 6/1991 | Gialiani | 208/108 |
| 5,139,983 | 8/1992 | Berrebi et al. | 502/33 |
| 5,157,009 | 10/1992 | Breysse et al. | 502/216 |
| 5,162,282 | 11/1992 | Lopez et al. | 502/220 |
| 5,169,819 | 12/1992 | Berrebi | 502/168 |
| 5,397,756 | 3/1995 | Dufresne et al. | 502/33 |

FOREIGN PATENT DOCUMENTS

| | | | |
|---|---|---|---|
| 107582-A | 5/1984 | European Pat. Off. | B01J 20/20 |
| 153233-A | 8/1985 | European Pat. Off. | B01J 37/20 |
| 637139 | 11/1974 | U.S.S.R. | B01J 01/22 |
| 2055603 | 3/1981 | United Kingdom | B01J 27/04 |

*Primary Examiner*—Helane Myers
*Attorney, Agent, or Firm*—Pamela J. McCollough

[57] ABSTRACT

The present invention relates to a process for presulfiding hydrocarbon processing catalysts by impregnating the catalyst with an inorganic polysulfide solution such that at least a portion of said sulfide or sulfur is incorporated in the pores of said catalyst, and thereafter heating the sulfur-incorporated catalyst under non-oxidizing conditions to fix the incorporated sulfur onto the catalyst.

10 Claims, No Drawings

с,786,293

PROCESS FOR PRESULFIDING HYDROCARBON PROCESSING CATALYSTS

FIELD OF THE INVENTION

This invention relates to a method of presulfiding hydrocarbon processing catalysts and catalyst compositions resulting from such treatment.

BACKGROUND OF THE INVENTION

It is well known that it is often desirable to employ the step of "presulfiding" or "presulfurizing" of the metals forming part of the composition of certain catalysts for refining and/or hydroconverting hydrocarbons, either before they are used initially, i.e., fresh catalysts, or before they are re-used following regeneration. Hydrocarbon processing catalysts, such as hydrotreating, hydrocracking and tail-gas treating catalysts are typically subjected to such a "presulfiding step".

A hydrotreating catalyst may be defined as any catalyst composition which may be employed to catalyze the hydrogenation of hydrocarbon feedstocks, and most particularly to hydrogenate particular components of the feed stock, such as sulfur-, nitrogen- and metals-containing organo-compounds and unsaturates. A hydrocracking catalyst may be defined as any catalyst composition which may be employed to crack large and complex petroleum derived molecules to attain smaller molecules with the concomitant addition of hydrogen to the molecules. A tail gas catalyst may be defined as any catalyst which may be employed to catalyze the conversion of hazardous effluent gas streams to less harmful products, and most particularly to convert oxides of sulfur to hydrogen sulfide which can be recovered and readily converted to elemental sulfur. A reduced catalyst may be defined as any catalyst that contains a metal in the reduced state such as, for example, an olefin hydrogenation catalyst. Such metals are typically reduced with a reducing agent such as, for example, hydrogen or formic acid. The metals on these reduced catalyst may be fully reduced or partially reduced.

Catalyst compositions for hydrogenation catalysts are well known and several are commercially available. Typically, the active phase of the catalyst is base on at least one metal of group VIII, VIB, IVB, IIB or IB of the Periodic Table of the Elements. In general, the hydrogenation catalysts contains at least one element selected from Pt, Pd, Ru, Ir, Rh, Os, Fe, Co, Ni, Cu, Mo, W, Ti Hg, Ag or Au supported usually on a support such as alumina, silica, silica-alumina and carbon.

Catalyst compositions for hydrotreating and/or hydrocracking or tail gas treating are well known and several are commercially available. Metal oxide catalysts which come within this definition include cobalt-molybdenum, nickel-tungsten, and nickel-molybdenum supported usually on alumina, silica and silica-alumina, including zeolite, carriers. Also, other transition metal element catalysts may be employed for these purposes. In general, catalysts containing at least one element selected from V, Cr, Mn, Re, Co, Ni, Cu, Zn, Mo, W, Rh, Ru, Os, Ir, Pd, Pt, Ag, Au, Cd, Sn, Sb, Bi and Te have been disclosed as suitable for these purposes.

For maximum effectiveness these metal oxide catalysts are converted at least in part to metal sulfides. The metal oxide catalysts can be sulfided in the reactor by contact at elevated temperatures with hydrogen sulfide or a sulfur-containing oil or feed stock ("in-situ").

However, it is advantageous to the user to be supplied with metal oxide catalysts having sulfur, as an element or in the form of an organo-sulfur compound, incorporated therein. These presulfurized catalysts can be loaded into a reactor and brought up to reaction conditions in the presence of hydrogen causing the sulfur or sulfur compound to react with hydrogen and the metal oxides thereby converting them into sulfides without any additional process steps being needed. These presulfurized catalysts provide an economic advantage to the plant operator and avoid many of the hazards such as flammability and toxicity, which the plant operator encounter when using hydrogen sulfide, liquid sulfides, organic polysulfides and/or mercaptans to sulfide the catalysts.

Several methods of presulfurizing metal oxide catalysts are known. Hydrotreating catalysts have been presulfurized by incorporating sulfur compounds into a porous catalyst prior to hydrotreating a hydrocarbon feedstock. For example, U.S. Pat. No. 4,530,917 discloses a method of presulfurizing a hydrotreating catalyst with organic polysulfides. U.S. Pat. No. 4,177,136 discloses a method of pre-sulfurizing a catalyst by treating the catalyst with elemental sulfur. Hydrogen is then used as a reducing agent to convert the elemental sulfur to hydrogen sulfide in situ. U.S. Pat. No. 4,089,930 discloses the pretreatment of a catalyst with elemental sulfur in the presence of hydrogen. U.S. Pat. No. 4,943,547 discloses a method of presulfurizing a hydrotreating catalyst by subliming elemental sulfur into the pores of the catalyst then heating the sulfur-catalyst mixture to a temperature above the melting point of sulfur in the presence of hydrogen. The catalyst is activated with hydrogen. PCT specification WO 93/02793 discloses a method of presulfurizing a catalyst where elemental sulfur is incorporated in a porous catalyst and at the same time or subsequently treating the catalyst with a liquid olefinic hydrocarbon.

However, these ex-situ presulfurized catalysts must be subjected to a separate activation step prior to contact with the hydrocarbon feed in a hydrocarbon processing reactor.

Therefore, it is an object of the present invention to prepare an activated, presulfurized or presulfided catalyst, either fresh or regenerated, without the requirement for a separate activation treatment prior to contact with the hydrocarbon feed in the reactor.

SUMMARY OF THE INVENTION

The present invention relates to a method of presulfurizing a sulfidable metal oxide(s)-containing catalyst. According to the invention, there is provided a method of presulfurizing porous particles of a sulfidable catalyst containing at least one metal or metal oxide, which comprises:

(a) contacting said catalyst with an inorganic polysulfide solution at a temperature such that at least a portion of said sulfide or sulfur is incorporated in the pores of said catalyst; and (b) heating said impregnated, sulfur-incorporated catalyst under non-oxidizing conditions such that said incorporated sulfide or sulfur is fixed onto the catalyst.

The method is particularly suitable for application to hydrotreating and/or hydrocracking or tail gas treating catalysts.

DETAILED DESCRIPTION OF THE INVENTION

The present invention relates to a process for presulfiding hydrocarbon processing catalysts by impregnating the catalyst with an inorganic polysulfide solution such that at least a portion of said sulfide or sulfur compound is incorporated in the pores of said catalyst, and thereafter heating the impregnated catalyst under non-oxidizing conditions to fix the incorporated sulfur onto the catalyst.

As used in this specification, the term "inorganic polysulfide" refers to polysulfide ions having the general formula $S_{(x)}^{2-}$ where x is greater than 2, preferably from about 3 to about 9, and more preferably from about 3 to about 5, and the "inorganic" terminology, in this context refers to the nature of the polysulfide moiety rather to the counterion, which may be organic. As used herein, the term "inorganic polysulfide solution" refers to a solution containing inorganic polysulfides. As used in this specification, the terms "metal(s)-", "metal oxide(s)-" and "metal sulfide(s)-" containing catalysts include catalyst precursors that are subsequently used as actual catalysts. Further, the term "metal(s)" includes metal(s) in partially oxidized form. The term "metal oxide(s)" includes metal oxide(s) in partially reduced form. The term "metal sulfide(s)" includes metal sulfide(s) that are partially sulfided as well as totally sulfided metals. The above terms include in part other components such as carbides, borides, nitrides, oxyhalides, alkoxides and alcoholates.

In the present invention, a presulfidable metal- or metal oxide-containing catalyst is contacted with an inorganic polysulfide solution to presulfurizing the presulfidable metal or metal oxide catalysts at a temperature and for a time effective to cause incorporation of the sulfide or sulfur into the pores of the catalysts. The catalyst is heated following impregnation under non-oxidizing conditions for a time sufficient to fix the incorporated sulfide or sulfur onto the catalyst.

The catalysts referred to herein as "sulfidable metal oxide catalyst(s)" can be catalyst precursors that are used as actual catalysts while in the sulfided form and not in the oxide form. While reference is made to metal oxide catalyst(s), it is understood that while the normal catalyst preparative techniques will produce metal oxide(s), it is possible to utilize special preparative techniques to produce the catalytic metals in a reduced form, such as the zero valent state. Since metals in the zero valent state will be sulfided as well as the oxides when subjected to sulfiding conditions, catalysts containing such sulfidable metals even in reduced or zero valent states will be considered for the purposes of this invention as sulfidable metal oxide catalyst(s). Further, since the preparative technique of the instant invention can be applied to regenerated catalysts which may have the metal sulfide not completely converted to the oxides, "sulfidable metal oxide catalyst(s)" also refers to these catalysts which have part of their metals in the sulfided state.

In a preferred embodiment, prior to impregnation with the inorganic polysulfide solution, the metal oxide catalyst particles or pellets are hydrated to equilibrium with air in order to reduce the initial exotherm.

In carrying out the process of the present invention, porous catalyst particles are contacted and reacted with an inorganic polysulfide solution under conditions which cause the sulfide or sulfur compounds to be incorporated into the pores of the catalyst by impregnation. The inorganic polysulfide-incorporated or sulfur compound-incorporated catalysts will be referred to as "sulfur-incorporated catalysts."

The inorganic polysulfide solution is typically prepared by dissolving elemental sulfur in an aqueous ammonium (or ammonium derivative, i.e., tetramethyl ammonium, tetraethyl ammonium, etc.) sulfide solution. Preferred polysulfides include inorganic polysulfides of general formula $S_{(x)}^{2-}$ wherein x is an integer greater than 2, preferably from 3 to 9 and more preferably from 3 to 5, such as, for example, $S_{(3)}^{2-}$, $S_{(4)}^{2-}$, $S_{(5)}^{2-}$, $S_{(6)}^{2-}$ and the like, and mixtures thereof.

The inorganic polysulfide solution is a red solution in which a dark coloring denotes a long chain polysulfide and a lighter coloring denotes a shorter chain polysulfide. The inorganic polysulfide solution thus prepared is used to impregnate the catalyst particles using a pore volume impregnation method or by incipient wetness such that the pores of the catalyst are filled without exceeding the volume of the catalyst. The amounts of sulfur used in the instant process will depend upon the amounts of catalytic metal present in the catalyst that needs to be converted to the sulfide. For example, a catalyst containing molybdenum would require two moles of sulfur or mono-sulfur compounds to convert each mole of molybdenum to molybdenum disulfide, with similar determinations being made for other metals. On regenerated catalysts, existing sulfur levels may be factored into the calculations for the amounts of sulfur required.

The amount of sulfur typically present in the inorganic polysulfide solution in the present process is in the range of from about 5 percent by weight to about 50 percent by weight, basis the total weight of the solution. Higher concentrations of sulfur can be obtained by increasing the concentration of the starting ammonium sulfide solution. The inorganic polysulfide solution will generally have a ratio of sulfur to sulfide by weight ranging from about 2:1 to about 5:1, and preferably in the range of from about 2:1 to about 3:1. The amount of sulfur in the inorganic polysulfide solution is generally such that the amount of sulfur impregnated onto the catalysts particles is typically an amount sufficient to provide for stoichiometric conversion of the metal components from the oxide form to the sulfide form and is generally in the range of from about 2 percent by weight to about 15 percent by weight, and preferably from about 4 percent by weight to about 12 percent by weight, basis the total weight of the sulfurized catalyst.

It has been found that the addition of presulfurizing sulfur in amounts down to about 50 percent of the stoichiometric requirement results in catalysts having adequate hydrodenitrification activity, which is an important property of hydrotreating and first stage hydrocracking catalysts. Thus, the amount of presulfurizing sulfur used for incorporation into the catalyst will typically range from about 0.2 to about 1.5 times the stoichiometric amount, and preferably from about 0.4 to about 1.2 times the stoichiometric amount.

For hydrotreating/hydrocracking and tail gas treating catalysts containing Group VIB and/or Group VIII metals the amount of presulfurizing sulfur employed is typically about 1% to about 15% by weight of the catalyst charged, and preferably, the amount of presulfurizing sulfur employed is about 4% to about 12% by weight of the catalyst charged.

The sulfur impregnation step will typically be carried out at a temperature ranging from about 0° C. to about 30° C. or higher, up to about 60° C. The lower temperature limit is fixed by the freezing point of the inorganic polysulfide solution under the specific conditions of impregnation, whereas the upper temperature limit is fixed primarily by decomposition of the inorganic polysulfide solution to volatile compounds and elemental sulfur.

Following impregnation of the catalyst particles with the inorganic polysulfide solution, the sulfur-incorporated catalyst is subjected to a heat treatment in the presence of a flowing non-oxidizing gas such as, for example, nitrogen, carbon dioxide, argon, helium and the like, at a temperature sufficient to drive out most of the residual pore volume water and to fix the sulfur on the catalyst. The heat treatment of the sulfur-incorporated catalyst is preferably carried out using a ramped temperature procedure in which the sulfur-incorporated catalysts are first heated to a temperature in the range of from about 50° C. to about 150° C., preferably about 120° C., to drive out most of the pore volume water. The catalysts were then ramped to a final hold temperature in the range of from about 120° C. to about 400° C., and preferably from about 230° C. to about 350° C., to fix the incorporated sulfur onto the catalyst. Following this heat treatment, the catalysts were cooled to room temperature and rehydrated with a water saturated non-oxidizing gas. The resulting catalysts are stable to handling in air.

The presulfurized or presulfided catalyst of the instant invention is then loaded into a hydrotreating and/or hydrocracking reactor or tail gas reactor, the reactor is heated up to operating (hydrotreating and/or hydrocracking or tail gas treating) conditions, and the catalyst is then immediately contacted with the hydrocarbon feedstock, without the need for an extended activation of the catalyst with hydrogen prior to contact of the catalyst with the hydrocarbon feedstock. While not wishing to be bound by any particular theory, it is believed that the extended activation period with hydrogen generally required for ex-situ presulfided catalysts is not necessary for catalysts presulfided according to the present invention because, in the present process, most of the sulfur has already reacted with the metal oxides to form metal sulfides, or alternatively, the sulfur is fixed in the pores of the catalyst to such an extent that it doesn't leave the pores of the catalyst prior to being converted to the sulfide.

The process of the present invention is further applicable to the sulfurizing of spent catalysts which have been oxy-regenerated. After a conventional oxy-regeneration process, an oxy-regenerated catalyst may be presulfurized as would fresh catalyst in the manner set forth above.

The present process is particularly suitable for application to hydrotreating and/or hydrocracking or tail gas treating catalysts. These catalysts typically comprise Group VIB and/or Group VIII metals supported on porous supports such as alumina, silica, silica-alumina, zeolite and the like. The materials are well defined in the art and can be prepared by techniques described therein, such as in U.S. Pat. No. 4,530,911, and U.S. Pat. No. 4,520,128, both incorporated by reference herein. Preferred hydrotreating and/or hydrocracking or tail gas treating catalysts will contain a group VIB metal selected from molybdenum, tungsten and mixtures thereof and a Group VIII metal selected from nickel, cobalt and mixtures thereof supported on alumina. Versatile hydrotreating and/or hydrocracking catalysts which show good activity under various reactor conditions are alumina-supported nickel-molybdenum and cobalt-molybdenum catalysts. Phosphorous is sometimes added as a promoter. A versatile tail gas treating catalyst which shows good activity under various reactor conditions is an alumina-supported cobalt-molybdenum catalyst.

The ex-situ presulfurization method of this invention allows the hydrotreating, hydrocracking and/or tail gas treating reactors to be started up more quickly by providing for immediate contact with the hydrocarbon feedstock in the reactor and eliminating the extended activation step with hydrogen which is necessary for conventional ex-situ presulfurized catalysts.

Thus, the instant invention relates to an improved hydrotreating and/or hydrocracking process which comprises contacting at hydrotreating and/or hydrocracking conditions a hydrocarbon feedstock and hydrogen with a catalyst which has been presulfurized according to the methods taught herein and which has been heated to hydrotreating and/or hydrocracking temperature in the presence of a hydrocarbon feedstock.

Hydrotreating conditions comprise temperatures ranging from about 100° C. to about 425° C., pressures above about 40 atmospheres. The total pressure will typically range from about 400 to about 2500 psig. The hydrogen partial pressure will typically range from about 200 to about 2200 psig. The hydrogen feed rate will typically range from about 200 to about 10000 standard cubic feet per barrel ("SCF/BBL"). The feedstock rate will typically have a liquid hourly space velocity ("LHSV") ranging from 0.1 to about 15.

Hydrocracking conditions comprise temperatures ranging from about 200° C. to about 500° C., pressures above about 40 atmospheres. The total pressure will typically range from about 400 to about 3000 psig. The hydrogen partial pressure will typically range from about 300 to about 2600 psig. The hydrogen feed rate will typically range from about 1000 to about 10,000 standard cubic feet per barrel ("SCF/BBL"). The feedstock rate will typically have a liquid hourly space velocity ("LHSV") ranging from 0.1 to about 15. First stage hydrocrackers, which carry out considerable hydrotreating of the feedstock may operate at higher temperatures than hydrotreaters and at lower temperatures than second stage hydrocrackers.

Tail gas treatment reactors typically operate at temperatures ranging from about 200° C. to about 400° C. and at atmospheric pressure. About 0.5–5% vol. of the tail gas fed to the reactor will comprise hydrogen. Standard gaseous hourly space velocities of the tail gas through the reactor will range from about 500 to about 10,000 hr$^{-1}$. There are several ways the subject catalysts can be started up in a tail gas treatment reactor. Claus unit feed or tail gas can be used to start up the subject catalysts. Supplemental hydrogen, as required, may be provided by a gas burner operating at a substoichiometric ratio in order to produce hydrogen.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes and are not to be construed as limiting the invention.

ILLUSTRATIVE EMBODIMENTS

Preparation of Inorganic Polysulfide Solution

An inorganic polysulfide solution for use in the following examples was prepared by adding 42 grams of elemental sulfur to a vigorously stirred solution of ammonium sulfide (150 milliliters, 22% wt.). The elemental sulfur immediately began to dissolve and the resulting solution became red-orange. The mixture was stirred until all of the sulfur was dissolved. The actual sulfur content of the solution was 30% wt. and the sulfur to sulfide ratio in the solution was 3.0.

EXAMPLE 1

A commercial hydrotreating catalyst having the properties listed below was used to prepare the sulfurized catalysts.

TABLE A

Catalyst Properties

| | |
|---|---|
| Nickel | 3.0% wt |
| Molybdenum | 13.0% wt |
| Phosphorous | 3.5% wt |
| Support | gamma alumina |
| Surface Area, m²/g | 162 |
| Water Pore Vol., cc/g | 0.47 |
| Size | 1/16 inch trilobes |

A 50 gram sample of the above catalyst was hydrated to equilibrium with air. The hydrated catalyst was then impregnated with 28.0 milliliters of the above inorganic polysulfide solution. This solution was added dropwise to an agitated bed of catalyst pellets contained in a nitrogen purged (0.5 liters/minute) three hundred milliliter 3N round bottomed flask, using a syringe pump apparatus. The stand on which the round bottomed flask was attached was vibrated using an FMC vibrating table, with the amplitude of vibration set so as to create a tumbling bed of catalyst pellets. The resulting black pellets were then heated from room temperature to 121° C. (250° F.) for one hour. The catalyst was then ramped to the final hold temperature of 260° C. (500° F.) and held for one hour. The final sulfur level was about 9.3% by weight of the total catalyst. The sulfur content of the catalyst were analyzed using LECO corporation SC-432 carbon-sulfur analyzer. The properties of the catalyst are listed in Table 1 below.

Comparative Example A

The commercial hydrotreating catalyst described in Example 1 above was subjected to the following in-situ sulfiding procedure.

A sample of the catalyst was crushed and sieved to 15–45 loaded into a testing unit having a set pressure of sulfiding gas (5% $H_2S$/95% $H_2$) of 1 atmosphere and a flow rate 45 liters/hour. The temperature is then ramped from room temperature up to 204° C. at 0.5° C. per minute and held at that temperature for two hours. The temperature is then increased to 371° C. at a rates of 0.5° C. per minute and held at that temperature for one hour and then cooled to room temperature. Thereafter, the unit is switched to a pure hydrogen flow and target rates and pressures are established, and then hydrocarbon feed is introduced. The final sulfur level was about 10% by weight of the total catalyst. The sulfur content of the catalyst were analyzed using LECO corporation SC-432 carbon-sulfur analyzer. The properties of the catalyst are listed in Table 1 below.

Catalyst Testing

The catalyst sulfided in Example 1 above was used to hydrotreat a catalytically-cracked heavy gas oil (CCHGO) in a trickle-flow reactor. A sample of the catalyst was crushed and sieved to a 16–45 mesh, diluted with silicon carbide and loaded into a trickle-flow reactor tube. The reactor tube was pressured to 1100 psig with hydrogen at a flow rate of 45 liters per hour. The reactor was then heated to 93° C. and a CCHGO feed was passed over the catalyst at a liquid hourly space velocity (LHSV) of 1.5. The temperature was ramped at a rate of 0.5° C. per hour up to 332° C. and then held for a period of sixty hours. Samples were then collected and analyzed to determine the hydrogenation, hydrodenitrification and hydrosulfurization activities. Rate constants are reported relative to Comparative Example A.

Comparative Example A was tested in a manner similar to Example 1 above, except that since the catalyst was sulfided by an in-situ sulfiding method, the catalyst was not unloaded from the reactor following sulfiding.

The results are presented in Table 1 below.

As can be seen in Table 1, a presulfiding method according to the invention which utilizes an inorganic polysulfide solution is an effective means for incorporating sulfur into a hydrotreating catalyst (Example 1).

TABLE 1

| Ex. # | Sulfur Source | Heat Temp °C. | wt % Sulfur | Sulfur Reten.[1] | Hydro[2] | HDS[2] | HDN[2] |
|---|---|---|---|---|---|---|---|
| 1 | Inorganic Poly-sulfide | 121 | 9.3 | 90% | 0.89 | 0.72 | 0.86 |
| Comp. Ex. A | 5% $H_2S/H_2$ | 371 | 8.8 | NM | 1.0 | 1.0 | 1.0 |

NM = Not Measured
[1] Reported as % of sulfur remaining relative to sulfur loaded onto catalyst
[2] Relative to $H_2S/H_2$ sulfided catalyst

EXAMPLE 2

Z-763 Ni-W/Ultrastable Y zeolite based hydrocracking catalyst, available from Zeolyst International Inc., was presulfurized according to the procedure set forth below.

A 100 gram sample of the above catalyst was hydrated to equilibrium with air. The hydrated catalyst was then impregnated with 23.4 milliliters of the above inorganic polysulfide solution diluted to the water pore volume of 38.6 milliliters. This solution was added dropwise to an agitated bed of catalyst pellets contained in a nitrogen purged (0.5 liters/minute) three hundred milliliter 3N round bottomed flask, using a syringe pump apparatus. The stand on which the round bottomed flask was attached was vibrated using an FMC vibrating table, with the amplitude of vibration set so as to create a tumbling bed of catalyst pellets. The resulting black pellets were then heated from room temperature to 150° C. for one hour. The catalyst was then ramped to the final hold temperature of 343° C. and held for one hour. After cooling to room temperature, the air sensitive catalyst was rehydrated with water using a water saturated nitrogen stream so that the catalyst can be safely handled in air for reactor loading. The final sulfur level was about 8% by weight of the total catalyst. The sulfur content of the catalyst were analyzed using LECO corporation SC-432 carbon-sulfur analyzer. The properties of the catalyst are listed in Table 2 below.

Comparative Example B

The commercial hydrocracking catalyst described in Example 2 above was subjected to the following in-situ sulfiding procedure.

A sample of the catalyst was loaded into a testing unit having a set pressure of sulfiding gas (5% $H_2S$/95% $H_2$) of 350 psig and a flow rate set to give a gas hourly space velocity (GHSV) of 1500 (e.g., for 40 ccs of catalyst, the flow rate is 60 liters/hour). The temperature is then ramped from room temperature up to 150° C. in one-half hour and then from 150° C. to 370° C. over a six hour period. The temperature is then held at 370° C. for two hours and then lowered to 150° C. Thereafter, the unit is switched to a pure hydrogen flow and target rates and pressures are established, and then hydrocarbon feed is introduced. The final sulfur level was about 5.5% by weight of the total catalyst. The sulfur content of the catalyst were analyzed using LECO corporation SC-432 carbon-sulfur analyzer. The properties of the catalyst are listed in Table 2 below.

Catalyst Testing

The catalysts sulfided in Example 2 and Comparative Example B above were used to hydrocrack a hydrotreated catalytically-cracked light gas oil in a trickle-flow reactor. A sample of the catalyst was crushed and sieved to a 16–45 mesh, diluted with silicon carbide and loaded into a trickle-flow reactor tube. The reactor tube was pressured to 1500 psig with hydrogen. The reactor was then heated to 150° C. and a hydrotreated catalytically-cracked light gas oil feed was passed over the catalyst at a liquid hourly space velocity (LHSV) of 6.0. The hydrogen to feed ratio in the reactor tube was 6500 standard cubic feet per barrel (SCF/BBL). The temperature was ramped at a rate of 22° C. per day for four days and at a rate of 6° C. per day for five days up to a temperature of 260° C. The temperature was then adjusted to obtain a target conversion of 12 wt % of 190+° C. in feed. The results are presented in Table 2 below.

TABLE 2

| Ex. # | Sulfur Source | Heat Temp °C. | wt % Sulfur | Normalized Sulfur[1] | Carbon | Hydrogen | Sulfur Retention[2] | Temp. Req'd (°C.)[3] |
|---|---|---|---|---|---|---|---|---|
| 2 | Inorganic Polysulfide | 343 | 7.48 | 7.48 | NM | NM | 96% | 348 |
| Comp. Ex. B | 5% $H_2S/H_2$ | 371 | 5.45 | 5.45 | NM | NM | — | 348 |

NM = Not Measured
[1]Normalized Sulfur = Analyzed Sulfur/(100 − (wt % C + wt % H)) × 100
[2]Reported as % of sulfur remaining relative to sulfur loaded onto catalyst
[3]Temperature required for target hydrocracking conversion. Target conversion is 12 wt % of 190+° C. (375+° F.) in feed.

As can be seen in Table 2, the sulfur retention of a catalyst presulfided according to the invention, in which an inorganic polysulfide solution is utilized (Example 2), is 96%, indicating that essentially all of the sulfur remains on the catalyst after the heating step. In addition, the hydrocracking activity of the catalyst in Example 2 is equivalent to that of a hydrocracking catalyst presulfided using a conventional in-situ presulfiding method (Comparative Example 2).

What is claimed is:

1. A process for presulfurizing porous particles of a sulfidable catalyst containing at least one metal or metal oxide, which comprises;

(a) impregnating said catalyst with an inorganic polysulfide solution such that at least a portion of said sulfide or sulfur is incorporated in the pores of said catalyst; and (b) heating said sulfur-incorporated catalyst in the presence of a non-oxidizing atmosphere.

2. The process of claim 1 wherein said inorganic polysulfide solution contains polysulfide ions having the general formula $S_{(x)}^{2-}$ where x is greater than 2.

3. The process of claim 1 wherein said inorganic polysulfide solution is prepared by dissolving elemental sulfur in an aqueous ammonium or ammonium derivative sulfide solution.

4. The process of claim 1 wherein said inorganic polysulfide solution contains an amount of sulfur in the range of from about 5 percent by weight to about 50 percent by weight, basis the total weight of the solution.

5. The process of claim 1 wherein, prior to step a), said catalyst containing at least one metal oxide is hydrated to equilibrium with air.

6. The process of claim 1 wherein said impregnation in step a) is carried out at a temperature ranging from about 0° C. to about 60° C.

7. The process of claim 1 wherein said heating in step b) is carried out at temperatures sufficient to remove residual pore volume water and to fix the incorporated sulfur onto the catalyst.

8. The process of claim 7 wherein said heating in step b) is carried out at temperatures ranging from about 50° C. to about 400° C.

9. The process of claim 1 wherein said heating in step b) is carried out in the presence of a non-oxidizing gas selected from the group consisting of nitrogen, carbon dioxide, argon, helium and mixtures thereof.

10. A presulfided catalyst composition prepared by a process which comprises:

(a) impregnating a catalyst containing at least one metal or metal oxide with an inorganic polysulfide solution such that at least a portion of said sulfide or sulfur is incorporated in the pores of said catalyst; and (b) heating said sulfur-incorporated catalyst in the presence of a non-oxidizing atmosphere to fix the incorporated sulfur onto the catalyst.

\* \* \* \* \*